US012792627B2

(12) United States Patent
Reymond et al.

(10) Patent No.: US 12,792,627 B2
(45) Date of Patent: Nov. 10, 2026

(54) INFORMATION RETRIEVAL AND/OR VISUALIZATION METHOD

(71) Applicant: UNIVERSITÄT BERN, Bern (CH)

(72) Inventors: Jean-Louis Reymond, Bulle (CH); Daniel Probst, Bern (CH)

(73) Assignee: Universität Bern, Bern (CH)

( * ) Notice: Subject to any disclaimer, the term of this patent is extended or adjusted under 35 U.S.C. 154(b) by 141 days.

(21) Appl. No.: 17/634,478

(22) PCT Filed: Aug. 12, 2020

(86) PCT No.: PCT/EP2020/072676
§ 371 (c)(1),
(2) Date: Feb. 10, 2022

(87) PCT Pub. No.: WO2021/028505
PCT Pub. Date: Feb. 18, 2021

(65) Prior Publication Data

US 2022/0300528 A1 Sep. 22, 2022

(30) Foreign Application Priority Data

Aug. 12, 2019 (EP) .................................... 19191193

(51) Int. Cl.
*G06F 16/26* (2019.01)
*G06F 16/22* (2019.01)

(52) U.S. Cl.
CPC .......... *G06F 16/26* (2019.01); *G06F 16/2246* (2019.01); *G06F 16/2255* (2019.01)

(58) Field of Classification Search
CPC ... G06F 16/26; G06F 16/2246; G06F 16/2255
See application file for complete search history.

(56) References Cited

U.S. PATENT DOCUMENTS 5,832,475 A * 11/1998 Agrawal ........... G06F 16/24556
6,556,983 B1 * 4/2003 Altschuler ............ G06F 16/907
707/E17.011
(Continued)

FOREIGN PATENT DOCUMENTS

WO WO-2005031600 A2 * 4/2005 ......... G06F 16/3346

OTHER PUBLICATIONS

Hashing Algorithms and Data Structures for Rapid Searches of Fingerprint Vectors Ramzi Nasr, Daniel S. Hirschberg, and Pierre Baldi Journal of Chemical Information and Modeling 2010 50 (8), 1358-1368 (Year: 2010).*
(Continued)

*Primary Examiner* — Mark E Hershley
(74) *Attorney, Agent, or Firm* — Buscher Patent PLLC

(57) ABSTRACT

A computer-implemented information retrieval method for generating visualization data from a database of objects, the method comprising the steps of establishing an index structure for a plurality of database objects, searching the index structure for nearest neighbors of database objects, generating a minimum spanning tree from nearest neighbors found, and generating visualization data from the minimum spanning tree. Further provided is a method of visualization of data objects in a database, the method comprising establishing an index structure for a plurality of database objects, searching the index structure for nearest neighbors of database objects, generating a minimum spanning tree from nearest neighbors found, generating visualization data from the minimum spanning tree and generating a display based on the visualization data.

17 Claims, 6 Drawing Sheets

Figure 1:
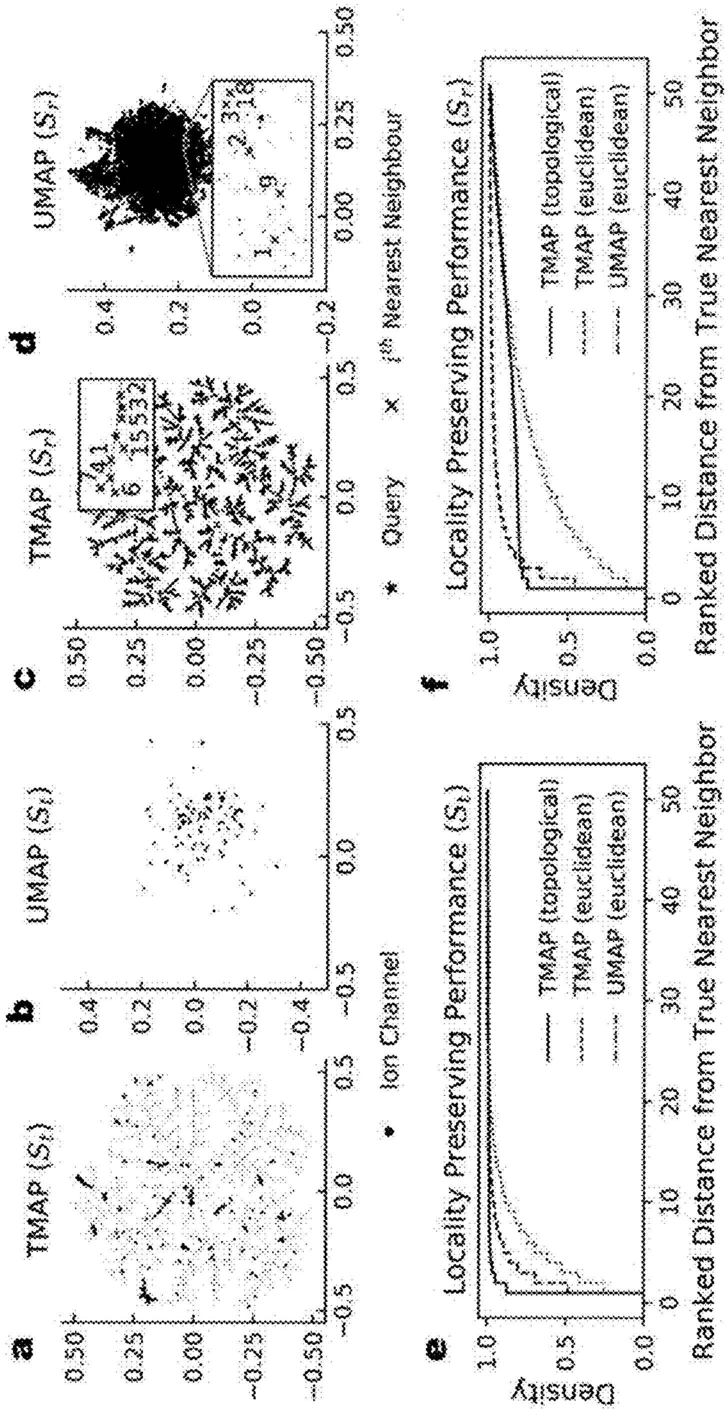
Figure 1:
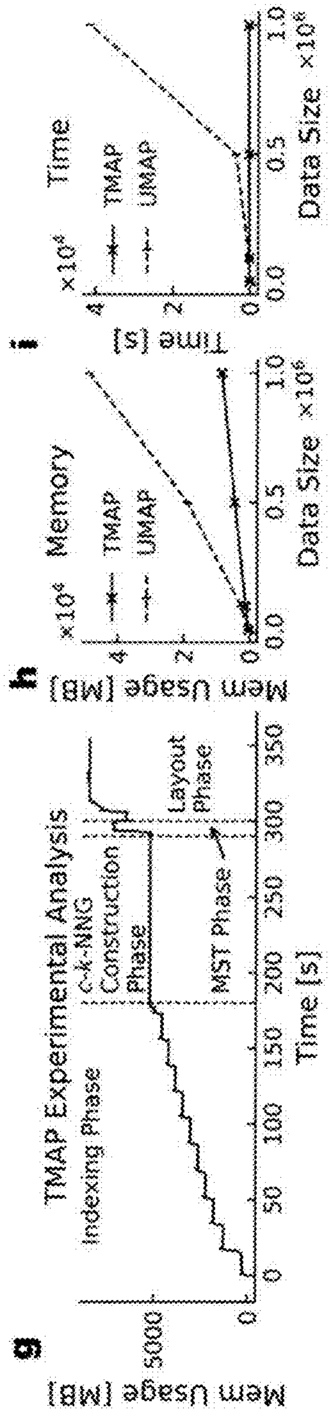

Influence of LSH Forest parameters *d* and *l* on visualization of MNIST.

(56) References Cited

U.S. PATENT DOCUMENTS

| | | | | |
|---|---|---|---|---|
| 9,436,702 | B2 * | 9/2016 | Pryakhin | G06F 16/2246 |
| 10,848,510 | B2 * | 11/2020 | Chauhan | H04L 43/045 |
| 11,132,111 | B2 * | 9/2021 | Chauhan | G06F 3/04847 |
| 11,132,721 | B1 * | 9/2021 | Uthaman | G06F 16/955 |
| 2006/0184690 | A1 * | 8/2006 | Milliken | H04L 63/1466 726/3 |
| 2007/0020642 | A1 * | 1/2007 | Deng | G16B 15/00 435/6.12 |
| 2008/0235216 | A1 * | 9/2008 | Ruttenberg | G06F 16/9535 707/999.005 |
| 2009/0052786 | A1 * | 2/2009 | Gross | G06V 10/7515 382/209 |
| 2010/0134497 | A1 * | 6/2010 | Hu | G06T 11/26 345/440 |
| 2010/0149186 | A1 * | 6/2010 | Gansner | G06T 11/60 345/440 |
| 2010/0312537 | A1 * | 12/2010 | Rayan | G16C 20/60 703/11 |
| 2011/0257889 | A1 * | 10/2011 | Klammer | G16B 30/00 702/19 |
| 2012/0250984 | A1 * | 10/2012 | Taylor | G06V 20/52 382/173 |
| 2012/0259792 | A1 * | 10/2012 | Duan | G06Q 10/0633 705/348 |
| 2012/0330566 | A1 * | 12/2012 | Chaisson | G16B 30/10 702/20 |
| 2014/0156679 | A1 * | 6/2014 | Tolbert | H04L 65/403 709/204 |
| 2015/0242393 | A1 * | 8/2015 | Zaragoza | G06F 40/10 704/9 |
| 2015/0286747 | A1 * | 10/2015 | Anastasakos | G06F 16/9535 707/776 |
| 2016/0035060 | A1 * | 2/2016 | Lahmi | G06T 1/0028 382/100 |
| 2016/0148103 | A1 * | 5/2016 | Sarrafzadeh | G06N 20/00 706/46 |
| 2017/0034591 | A1 * | 2/2017 | Ray | H04N 21/2668 |
| 2018/0204111 | A1 * | 7/2018 | Zadeh | G06N 3/088 |
| 2019/0199736 | A1 * | 6/2019 | Howard | H04L 63/145 |
| 2019/0205325 | A1 * | 7/2019 | Dobrynin | G06F 16/3344 |
| 2019/0272425 | A1 * | 9/2019 | Tang | G06T 19/006 |
| 2019/0327292 | A1 * | 10/2019 | Ziebell | G06Q 10/40 |
| 2020/0104379 | A1 * | 4/2020 | Wada | G06F 16/221 |
| 2020/0158810 | A1 * | 5/2020 | Zhang | G01S 5/0278 |
| 2020/0321076 | A1 * | 10/2020 | Putnam | G16B 30/20 |
| 2020/0327421 | A1 * | 10/2020 | Bathe | B82Y 10/00 |
| 2021/0166459 | A1 * | 6/2021 | Miller, IV | G06F 1/1637 |

OTHER PUBLICATIONS

International Search Report and Written Opinion, PCT/EP2020/072676, dated Nov. 2, 2020, 9 pages.

International Preliminary Report on Patentability, PCT/EP2020/072676, dated Feb. 8, 2022, 7 pages.

* cited by examiner

COIL20: All classes are shown. MNIST: Pictures classified as depicting the number "6" are shown. FMNIST: Pictures classified as depicting "trousers" are shown.

Influence of LSH Forest parameters $d$ and $l$ on visualization of MNIST.

INFORMATION RETRIEVAL AND/OR VISUALIZATION METHOD

REFERENCE TO RELATED APPLICATIONS

This application is a 35 U.S.C. 371 national stage filing of International Application No. PCT/EP2020/072676, filed on Aug. 12, 2020, which claims priority to Application EP 19191 193.2, filed on Aug. 12, 2019, the contents of which are hereby incorporated by reference.

The present invention relates to the retrieval of information, in particular to the retrieval of information for generating a visualization of data from a database of objects.

In recent times, storing extremely large amounts of data has become feasible, allowing to gather data in ever-larger databases. One of the reasons to store data in large databases is the assumption that patterns can be found in the data that lead to scientific progress or are of economic or other interest, the expected results obtained being the better, the larger the database is.

For example, when a given small target molecule has some positive biological effect, such as a high binding affinity, to a given site of a protein site, but is otherwise not suitable to be used as a pharmaceutical compound, e.g. because of low solubility, one might assume that other similar molecules exist that closely correspond to the target molecule in that they have the same positive properties but lack the negative properties. Now, if a chemical database comprises data for a large number of small molecules relating their biological and physical properties such as toxicity, binding affinity to specific protein sites, solubility asf., for drug discovery, a search can be done in this database for similar molecules. Accordingly, a search or "virtual screening" could be made in the database for such molecules, provided it is possible to identify molecules "similar" to the initial target molecule.

However, while the results obtained in this manner can be expected to be better for ever-larger databases, the task of identifying similar molecules becomes more and more computationally challenging the larger the database is. Also, the cost of evaluating whether a molecule in the database found to be similar to a given target molecule is extremely high. Therefore, it is desirable to allow a researcher to control the results of a search in the database and understand the patterns that lead to the result that molecules are "similar."

Because of this, it is frequently desired to visualize data structures in a manner that can be easily understood by a researcher. Given the computational challenges, such visualization should be done in a manner that is applicable even where data sets become extremely large. In this context, it should be noted that even where "small" molecules are restricted to molecules having less than 17 atoms, databases such as PubChem, GDB, and others may comprise several million entries. This fact poses significant technical problems because accessing the information or generating visualization data relating to the huge number of molecules not only requires large amounts of main memory but also necessitates a high memory bandwidth if results are to be obtained within acceptable times. Furthermore, also the necessary calculations themselves may take very significant time even with powerful processors. It is understood that operating powerful processors for a long time and accessing memory with high bandwidth consumes considerable power.

Such problems are not only encountered when attempting to derive information from a chemical database. Similar problems may arise, for instance, when predicting failures from sensor data of a machine having a large number of sensors, distinguishing background and "true" signals viewed by detector signals from many channels in a particle physics experiment, or determining authors of text in an extensive text database, which could be done by looking at smaller fragments of the text.

It can be understood that in the illustrative scenarios, different parameters, such as different biological properties of a molecule in a chemical database, values measured with different sensors, signal values of different channels in a particle physics experiment or even text fragments are more or less independent of each other and hence may be considered to constitute different dimensions.

From this perspective, information must be retrieved from objects in a high-dimensional space and, if visualization is needed, the pattern shown must have a significantly lower dimension. Typically, the pattern is shown on a flat-screen, so the dimension of the pattern should be two-dimensional, but it would also be possible to show on a screen a projection of a three-dimensional pattern that, for example, is rotating in three-dimensional space so that the three-dimensional pattern can be easily perceived. Note that it is even possible to visualize additional dimensions by varying properties in a screen image such as color hue, color saturation, or line strength but that nonetheless, the dimension of the visualization is way lower than the dimension of the underlying database.

Hence, the invention could also be considered to relate to a computer-implemented method of visualizing high-dimensional data sets.

From the document UMAP: Uniform Manifold Approximation and Projection for Dimension Reduction by L. McInnes et al., Dec. 6, 2018, a manifold-learning technique for dimension reduction is known. It is stated that dimension reduction seeks to produce a low dimensional representation of high dimensional data that preserves the relevant structure and is an important problem in data signs for both visualization and pre-processing for machine learning. It is stated that dimension reduction algorithms tend to fall into 2 categories, namely those that seek to preserve the distance structure within the data and those that favor the preservation of local distances over global distance. Given this, the UMAP algorithm is introduced as a combination of Riemannian geometry and theoretic approaches to the geometric realization of fuzzy simplicial sets. UMAP is stated to use local manifold approximations, patching together their local fuzzy simplicial set representations to construct a topological representation of the high dimensional data. The authors explain that the first phase of the UMAP effort can be thought of as of the construction of the weighted k-neighbor graph. It is stated that, in practice, UMAP uses a force-directed graph layout algorithm in low dimensional space that utilizes a set of attractive forces applied along edges and a set of repulsive forces applied among vertices. The authors also state that a k-nearest neighbor computation can be achieved via an algorithm that is of an empirical complexity of $O(N^{1.14})$. It is then stated that an amount of optimization work required scales with the number of edges in the fuzzy graph resulting in a complexity of O(kn). The authors also compare the computational comparison to other algorithms alleging that the UMAP algorithm performs faster than other algorithms. However, the algorithm is stated to lack strong interpretability known from other techniques such as principal component analysis so that where strong interpretability is critical, even the authors recommend other techniques.

From a paper entitled "PDB-Explorer: a web-based interactive map of the protein data bank in shape space" Jin et al., BMC Bioinformatics (2015) 16:339 DOI 10.1186/s12859-

015-0776-9, including one of the inventors of the present application as a co-author, it is known that options to access global structural diversity of a specific protein data bank remain limited. A web-based database exploration tool comprising an active color-coded map of the PDB chemical space and a nearest neighbor search tool is suggested in the document. The authors suggest determining relationships between objects in the database using their calculated molecular fingerprint.

From the document "GTM: The Generative Topographic Mapping" by C. M. Bishop et al., Technical Report NCRG/96/015, it is known that many data sets exhibit significant correlations between the variables and that one way to capture such structure is to model the distribution of the data in terms of latent or hidden variables. An important application of latent variable models allegedly is data visualization. The authors consider, among other things, the computational costs of different mapping algorithms and the performance of the algorithm. They also state that a potential advantage of the algorithm suggested in practical application arises from a reduction in the number of experimental training runs.

In the document "The self-organizing map" by T. Kohonen, Proceedings of the IEEE, volume 68, no. 9, September 1990, pg. 1464 et sec, it is suggested that a self-organizing map creates spatially-organized "internal representations of various features" and that supervised finetuning of weight vectors used can have the effect that the self-organizing map is particularly successful in pattern recognition tasks involving very noisy signals. In an example, taxonomy (nonhierarchical clustering) of abstract data is suggested, and a self-organized map of an input data matrix is compared to a minimal spanning tree corresponding to the input data matrix.

From the paper "Visualizing Data using t-SNE" by L. van der Maaten, Journal of Machine Learning Research 9 (2008) 2579-2605, a technique called t-SNE that visualizes high-dimensional data by giving each data point a location in a 2 or 3-dimensional space is known. The technique is stated to be a variation of stochastic neighbor embedding and explains that the visualization of high-dimensional data is an essential problem in many different domains. The authors state that traditional dimensionality reduction techniques such as PCA and classical multidimensional scaling focus on keeping the low-dimensional representations of dissimilar data points far apart. In contrast, for high-dimensional data that lie on or near a low-dimensional non-linear manifold, it is usually more important to keep the low-dimensional representation of various similar data points close together, which would not be possible with a linear mapping. Stochastic neighbor embedding starts by converting high-dimensional or Euclidean distances between data points into conditional probabilities that represent similarities. The similarity of each pair of data points is stated to be the conditional probability that one data point would pick another data point as its neighbor if neighbors were picked in proportion to their probability density under a Gaussian-centered at the picking data point. For nearby data points, this conditional probability is high, whereas, for widely separated data points, the probability is almost infinitesimal t-SNE suggests using distributions other than Gaussian distributions. The authors state that t-SNE has a computational and memory complexity that is quadratic in the number of data points, making it infeasible in practice to apply the standard version of t-SNE to data sets that contain many more than around 10.000 points.

From the document "ChemTreeMap: an interactive map of biochemical similarity in molecular data sets" by J. Lu et al. in Bioinformatics, 32(23), 2016, 3584-3592 it is known that while computational biology often incorporates diverse chemical data to probe a biological question, the existing tools for chemical data are ill-suited for the huge data sets inherent to bioinformatics. The document attempts to describe an interactive bioinformatics tool designed to explore chemical space and mine the relationships between chemical structure, molecular properties, and biological activity. It is stated that requiring users to choose selection rules and tune parameters in graphic tools could limit the utility for large, diverse sets of data and that allowing users to map any property of interest facilitates on-the-fly customized exploration of the relationships between molecular structure and other properties. The authors state that the organization and visualization of a molecular library require 3 considerations, namely how to represent a molecule, how to quantify the similarities, and how to represent the similarities graphically.

For the representation of the molecules, stereochemistry-aware extended connectivity fingerprints are suggested, namely ECFP6. However, other fingerprints, such as MACCS keys or topological torsion keys, could be added. It is stated that the similarity of each pair of molecules can be calculated using the number of chemical features that both molecules share in common divided by the union of all features and that a hierarchical tree can be built. It should be noted that the workflow for ChemTreeMap suggests calculating fingerprints such as its ECFP6 #S, to build a tree structure and to then calculate 2D coordinates from the tree structure built. The authors suggest that in visualization, a broad color scheme could be used and that data could be added through outlines.

Regarding similarity searches, the document "Hashing for Similarity Search: A Survey" by J. Wang et al., arXiv: 1408.2927v1, Aug. 13, 2014, it is known that in general hashing is an approach of transforming a data item to a low-dimensional representation or equivalently a short code consisting of the sequence of bits.

The authors divide hashing algorithms into 2 main categories, namely locality sensitive hashing, which designs hash functions without exploring the data distribution and learning to hash, which learns hash functions according to the data distribution. Several distances are discussed such as the Hamming distance, the Jaccard-coefficient, as well as normalized Hamming distance, asymmetric Hamming distance, weighted Hamming distance, Manhattan distance, symmetric Euclidean distance, asymmetric Euclidean distance, for example where a concept of molecular similarity is used in the context of ligand-based virtual screening to use known actives to find new molecules to test.

In particular, a document "Open-source platform to benchmark fingerprints for ligand-based virtual screening" by S. Riniker et al., Journal of Cheminformatics 2013, 5:26, uses a benchmarking platform to assess different fingerprints over many targets from publicly available collections of data sets in the context of searching for molecular similarity. The authors note that there is a wide variety of fingerprinting algorithms, several methods for evaluating virtual screening performance, but little consensus as to which is best.

It should be noted that, while hereinafter in the context of preferred embodiments of the present invention described, certain fingerprints are explicitly mentioned, fingerprints other than those explicitly mentioned herein in the context of embodiments could be used, and that an assessment of different fingerprints could be executed when different types of databases having different objects are to be visualized or used as databases from which information is to be retrieved, as well as if the type of information to be retrieved or visualized is different. It should be understood in particular that those fingerprints and derivatives thereof, suggested for virtual screening mentioned in the cited documents, could all be used in the context of the present invention.

"A probabilistic molecular of fingerprint for big data settings" from D. Probst and J.-L. Reymond in J. Chemin-form. (2018) 10:66. In this publication, the authors note that to describe small organic molecules, the extended connectivity of fingerprint for up to 4 bonds (ECFP4) performs best in benchmarking drug analog recoveries studies as it encodes substructures with a high level of detail. However, the authors note that ECFP4 requires high dimensional representations to perform well, resulting in nearest-neighbor searches in huge databases such as GDB, PubChem, or ZINC to perform slowly due to the high dimensionality. Accordingly, the authors report a new fingerprint that encodes detailed substructures using the extended connectivity principle of ECFP. The authors state that a key advantage of the fingerprint suggested in the document consists of the implementation of a specific hash method, MinHash, which enables the use of the LSH forest algorithm to perform a specific search, ANN (approximate nearest neighbor) search in the sparse high-dimensional hash space. They compare several search algorithms and compare fingerprints indexed by inter alia LSH forest. From benchmarking, they conclude that LSH forest performs better for smaller numbers of nearest neighbors compared to an algorithm termed Annoy and note that by increasing the number of nearest neighbors considered by a factor of kc and then selecting actual nearest neighbors from the enlarged set, the performance is significantly increased. As in other papers, the computational effort associated with different methods is observed, and query times for different algorithms are compared. The authors conclude that MHFP6 enables approximate k-nearest neighbor searches in sparse and high-dimensional binary chemical spaces without folding through the direct application of ANN algorithms such as LSH forest. Thereby, successfully removing problems otherwise associated with high-dimensionality (termed as "the curse of dimensionality") while preserving locality.

When nearest neighbors are searched for, suitable searching methods must be used. In the document "Efficient K-Nearest Neighbor Graph Construction for Generic Similarity Measures" by W. Dong et al., ACM 978-1-4503-0632-4/11/03, it is known that k-nearest neighbor graph construction is an important operation with many data-related applications including similarity search, data mining, and machine learning. The authors note that certain methods for constructing k-nearest neighbor graphs do not scale or are specific to certain similarity measures. They emphasize that a good construction algorithm should be general, scalable, space-efficient, fast, and accurate as well as easy to implement. They consider several similarity measures, for example, cosine similarity and Jaccard similarity on text data. The authors consider the empirical complexity as data sets scale. The authors allege that it is hard for LSH (locality sensitive hashing) to achieve a high recall (i.e., good results).

From "Locality sensitive hashing for the edit distance" by G. Marçais et al., bioRxiv, preprint TTP: //dx.doi.org/10.1101/534446, the use of LSH in the context of DNA sequence aligning is discussed. They note that in aligning genomic sequences, locality sensitive hashing is known to reduce the amount of work necessary. The procedure is a dimensionality reduction method where first sequences are summarized into sketches much smaller than the original sequence while preserving important information to estimate how similar 2 sequences are, and to then directly compare those sketches, and using these sketches as key into hash tables to find pairs of sequences that are likely to be similar. Thereafter, a more thorough and computationally more expensive alignment procedure may be used on such candidate pairs to refine an actual alignment. They introduce the edit distance, which is the number of operations and mismatches, insertions or deletions, needed to transform one string into another string. This edit distance is also known as Levenshtein distance. The authors note that methods used can lead to false negatives, that is alignments missed or false positives where a non-existent potential alignment is reported. The authors understand that extra computational work is needed in such cases.

From "LSH Forest: Practical Algorithms Made Theoretical" by A. Andoni et al., Nov. 6, 2016, it is known that LSH forest heuristics can be modified to increase their performance.

WO 2005/031600 discloses a method of determining cluster attractors for a plurality of documents comprising at least one term. The method comprises calculating, in respect of each term, a probability distribution indicative of the frequency of occurrence of the, or each, other term that co-occurs with the said term in at least one of said documents. Then, the entropy of the respective probability distribution is calculated. Finally, at least one of said probability distributions is selected as a cluster attractor depending on the respective entropy value. The method facilitates very small clusters to be formed, enabling more focused retrieval during a document search.

US 2019/205325 discloses techniques for the automated discovery and extraction of discourse phrases or in other words terms that are representative of a topic or concept communicated via a plurality of electronic documents, to facilitate the generation of a language model that is applicable to interpreting commands for invoking application-based actions via a digital assistant device.

In view of the above, there remains an urgent need for a resource-efficient way to generate intuitively interpretable visualizations from datasets, in particular from large datasets.

It is an object of the present invention to provide methods for retrieving information and/or generating visualization data from a database. This object is achieved by the subject matter of the embodiments provided herein and as characterized by the claims. Some of the preferred embodiments can be found in the dependent claims.

Accordingly, the present invention relates to the following embodiments:

1. A computer-implemented method for visualization of data objects in a database, the method comprising the steps of
   - establishing an index structure for a plurality of database objects by providing a descriptor for each of the plurality of database objects and a plurality of hashing functions and specifying a plurality of index trees by performing a locality sensitive hashing of the descriptor based on the plurality of hash functions,
   - searching the index structure for nearest neighbors of database objects,
   - generating a minimum spanning tree from nearest neighbors found, and using a probabilistic layout algorithm to generate visualization data from the minimum spanning tree for visualization of data objects in a database.

2. The computer-implemented method, according to the preceding embodiment, wherein establishing an index structure, the database or parts thereof are retrieved from a non-volatile computer-readable memory, in particular a local disk, a web-server or a cloud.

3. The computer-implemented method according to any of the preceding embodiments wherein the database comprises more than 100.000 objects, in particular more than 250.000 objects, in particular more than 500.000 objects, in particular more than 1.000.000 and/or in particular more than 10.000.000 objects.

4. The computer-implemented method according to any of the preceding embodiments wherein the database comprises objects having more than 20, in particular more than 30 dimensions.

5. The computer-implemented method, according to any of the previous embodiments, wherein at least one index tree specified has at least one sequence of linear nodes and the step of establishing the index structure comprises collapsing the linear nodes.

6. The computer-implemented method, according to any of the previous embodiments, wherein an LSH forest is specified comprising a plurality of different index trees.

7. The computer-implemented method according to the preceding embodiment, wherein the LSH forest comprises a number of trees that is smaller than the number of different hashing functions, in particular smaller than half of the number of different hashing functions.

8. The computer-implemented method, according to the previous embodiment, wherein the LSH tree or LSH forest is stored for the next neighbor search, in particular in a RAM while searching for next neighbors.

9. The computer-implemented method according to any of the previous embodiments, wherein the database objects are chemical molecules and establishing an index structure for a plurality of database objects comprises providing as a descriptor a molecular fingerprint, in particular MHFP or ECFP fingerprints; or the database objects are texts and establishing an index structure for a plurality of database objects comprises providing as a descriptor a Minhash encoding; or the database objects are binary objects and establishing an index structure for a plurality of database objects comprises providing as a descriptor a weighted Minhash encoding.

10. The computer-implemented method according to any of the previous embodiments wherein the step of searching the index structure for nearest neighbors of database object comprises identifying neighbor objects that are approximately next neighbors in view of a Hamming distance measure, a Levinshtein distance measure, a Cosine similarity measure and a Jaccard similarity measure.

11. The computer-implemented method according to any of the previous embodiments wherein the step of searching the index structure for nearest neighbors of database object comprises selecting a number of k approximate next neighbor objects, in particular selecting k next neighbors from kc*k neighbors identified with a kc>1.

12. The computer-implemented method according to any of the previous embodiments, wherein the probabilistic layout algorithm comprises the use of a force-directed graph drawing technique.

13. The computer-implemented method according to any of the previous embodiments, wherein the probabilistic layout algorithm is an efficient probabilistic layout algorithm.

14. The computer-implemented method according to the preceding embodiment, wherein the efficient probabilistic layout algorithm comprises the use of a spring-electrical model layout method with a multilevel multipole-based force approximation.

15. The computer-implemented method according to any of the previous embodiments, wherein the visualization data is output in a portable data format, in particular as portable HTML data.

16. A computer-implemented method for visualization of data objects in a database, the method comprising the steps of establishing an index structure for a plurality of database objects by providing a descriptor for each of the plurality of database objects and a plurality of hashing functions and specifying a plurality of index trees by performing a locality sensitive hashing of the descriptor based on the plurality of hash functions and an LSH forest is specified comprising a plurality of different index trees, searching the index structure for nearest neighbors of database objects, generating a minimum spanning tree from nearest neighbors found, using an optimization method and a layout algorithm to generate visualization data from the minimum spanning tree for visualization of data objects in a database.

17. A computer-implemented method for visualization of data objects in a database, the method comprising the steps of establishing an index structure for a plurality of database objects comprising more than 100.000 objects, in particular more than 250.000 objects, in particular more than 500.000 objects, in particular more than 1.000.000 and/or in particular more than 10.000.000 objects, searching the index structure for nearest neighbors of database objects, generating a minimum spanning tree from nearest neighbors found, using a probabilistic layout algorithm to generate visualization data from the minimum spanning tree for visualization of data objects in a database.

18. A computer-implemented information retrieval method for retrieving information from a database of objects, the method comprising the steps of establishing an index structure for a plurality of database objects comprising more than 100.000 objects, in particular more than 250.000 objects, in particular more than 500.000 objects, in particular more than 1.000.000 and/or in particular more than 10.000.000 objects, searching the index structure for nearest neighbors of database objects, generating a minimum spanning tree from nearest neighbors found, and retrieving information from the minimum spanning tree.

19. A computer-implemented information retrieval method for retrieving information from a database of objects, the method comprising the steps of
  establishing an index structure for a plurality of database objects by providing
  a descriptor for each of the plurality of database objects and a plurality of hashing functions and specifying a plurality of index trees by performing a locality sensitive hashing of the descriptor based on the plurality of hash functions and an LSH forest is specified comprising a plurality of different index trees,
  searching the index structure for nearest neighbors of database objects,
  generating a minimum spanning tree from nearest neighbors found, and retrieving information from the minimum spanning tree.

According to a first general aspect of the present invention, a computer-implemented information retrieval method for retrieving information and/or generating visualization data from a database of object is suggested, the method comprising the steps of establishing an index structure for a plurality of database objects, searching the index structure for nearest neighbors of database objects, generating a minimum spanning tree from nearest neighbors found, and generating visualization data from the minimum spanning tree.

Particularly, in certain embodiment of the invention, a computer implemented method for visualization of data objects in a database is suggested, the method comprising the steps of establishing an index structure for a plurality of database objects by providing a descriptor for each of the plurality of database objects and a plurality of hashing functions and specifying a plurality of index trees by performing a locality sensitive hashing of the descriptor based on the plurality of hash functions, searching the index structure for nearest neighbors of database objects, generating a minimum spanning tree from nearest neighbors found, using a probabilistic layout algorithm to generate visualization data from the minimum spanning tree for visualization of data objects in a database.

The term "data objects," as used herein, refers to a conceptual entity generally corresponding to a contiguous block of a specific size at a specific location in memory having one or more attributes that define the entity. In some embodiments of the invention, the data objects are Images, SMILES (Simplified Molecular Input Line Entry Specification), Atomic coordinates, Text, Gene expression, Signal intensity or Particle ID, Co-regulation scores (e.g., of proteins).

The term "descriptor," as used herein, refers to an entity that is indicative for at least one data object and that can be used as an object of an index structure. In some embodiments of the invention, the descriptor is a fingerprint (e.g., a molecular fingerprint), an identifier (e.g., unique identifier) or a data descriptor (e.g., array descriptor).

The term "hash function" refers to a non-invertible function that can be used to map items (e.g., data objects) of arbitrary size to fixed-size values.

The term "locality sensitive hashing," as used herein, refers to a hash function that allows high-dimensional input items to be reduced to low-dimensional versions while preserving relative distances between items. Such an exemplary hashing function is described in "Locality sensitive hashing for the edit distance" by G. Marçais et al., bioRxiv, preprint TTP: //dx.doi.org/10.1101/534446.

The term "tree," as used herein, refers to an undirected graph in which any two nodes are connected by exactly one path, or equivalently a connected acyclic undirected graph. A graph in this context is made up of nodes that are connected by edges.

The phrase "searching for nearest neighbors", as used herein, refers to the use of a nearest neighbor search algorithm. Preferably the nearest neighbor search algorithm, as used in the invention, is a k-nearest neighbor search algorithm. An example of a k-nearest neighbor algorithm "Efficient K-Nearest Neighbor Graph Construction for Generic Similarity Measures" by W. Dong et al., ACM 978-1-4503-0632-4/11/03

The term "minimum spanning tree", as used herein, refers to a subset of the edges of a connected, edge-weighted undirected acyclic graph that connects all nodes of the graph together, with the minimum possible sum of edge weights.

The term "visualization," as used herein, generally refers to a visual representation of a given set of data presented to a user (e.g., on a display screen).

The term "probabilistic layout algorithm," as used herein, refers to a layout algorithm with a probabilistic optimization algorithm that allows for faster and/or less computational resource-demanding generation of visualization data from a minimum spanning tree than the layout algorithm alone. The term "layout algorithm," as used herein, refers to a class of algorithms that can be used for drawing graphs. In some embodiments of the invention, the layout algorithm is a force-based layout method, a spectral layout method, an orthogonal layout method, a tree layout algorithm, or a layered graph drawing method. In some embodiments of the invention, the probabilistic optimization algorithm is a simulated annealing algorithm, a genetic algorithm, or a multi-level algorithm.

A large number of unconnected components and/or low resolution of components in a visualization may make recognition, use and/or interpretation of visualized data difficult for the user. The method of the invention allows drawing graphs with more connected components (e.g., linked branches or linked subclusters) and producing a more even distribution of components on the canvas compared to previous methods such as UMAP, thus enabling better visual resolution than previous methods and thereby facilitates interpretation of the visualization by the user (FIG. 1 *a-d*). The method of the invention allows for a higher resolution of variances and errors within clusters by visualizing how sub-clusters and/or branches within clusters are linked and which true positives connect to false positives. Therefore, the surprising effect of the invention is in part based on the visibility and interpretability of the visualization data generated by the method.

Furthermore, the locality preserving performance, such as the nearest neighbor relationships preservation after embedding based on topological or Euclidean distance, are better in visualizations generated by the method of the invention compared to visualizations of previous methods (FIG. 1 *e-f*). Therefore, the surprising effect of the invention is in part based on the locality preserving performance of the visualization data generated by the method.

By use of the combination of the steps of the method of the invention, resource-intense steps can be avoided. In this manner, even for very large databases having objects that have a variety of different parameters and can thus be considered to be high dimensional objects, the computational effort to determine visualization data remains rather low, despite the generation of visualization data that allow an improved evaluation. The computational effort is reduced inter alia with respect to the frequency database objects that need to be accessed, with respect to the storage of intermediate results both in view of the size of intermediate storage space and with respect to the frequency of accessing the objects and intermediate results, and with respect to the overall number of computational steps that need to be executed to generate the visualization data.

Accordingly, even for very large databases, visualization data can be generated with very low amounts of electrical energy consumed during the process and in a fast manner such that conventional computers, laptops and so forth suffice to provide an easily acceptable user experience in generating visualization data.

For establishing the index structure, the entire database or parts thereof may be retrieved from a non-volatile memory, such as a non-volatile computer readable memory, in particular a USB thumb drive, read-only memory (ROM), ferroelectric RAM, magnetic computer storage devices (e.g., local disc drive, floppy disks, and magnetic tape), optical discs, flash memory (e.g., SSD), a web-server or a cloud. The term "non-volatile computer-readable memory", as used herein, refers to a type of computer-readable memory that can retrieve stored information even after having been power cycled. The term "non-volatile computer-readable memory" also refers to various types of non-volatile memory capable of being accessed by the computer device via a network or communication link such as a web-server or a cloud. For example data may be retrieved over a modem, over the Internet, or over a local area network. Given that the database only needs to be accessed for establishing the index structure and given that this can be done in a simple manner, database access is generally unlikely to constitute a restricting step and hence, even slow local non-volatile computer readable memory arrangements such as hard discs can be used.

In a typical use case, the database will comprise more than 100.000 objects, in particular more than 250.000 objects and in particular more than 500.000 objects, in particular more than 1.000.000 objects and/or in particular more than 10.000.000 objects. In other words, the computer implemented method is easily capable of handling very large databases which is highly advantageous for mining of chemical databases during drug discovery or similar applications.

The method of the invention is therefore useful for information retrieval to generate visualization data and/or for visualization of data objects in a database from particular large datasets with surprisingly low computational effort and/or with surprisingly high locality preserving performance.

Given the low computational effort, it is possible to use standard computers, laptops and so forth rather than dedicated high performance servers.

The computer implemented information retrieval method is particularly suitable for high dimensional objects.

The term "dimension", as used herein, refers to a parameter of at least one data object and/or at least one descriptor that influences visualization data of the data object(s). In certain embodiments the dimensions are biological properties of data objects, chemical properties of data objects, physical properties of data objects, metadata of data objects, and/or parameters of data objects obtained by certain manner (e.g., at a certain time point, by a certain experiment, by a certain instrument of by certain part of an instrument).

Given that the visualization method is usually used for generating a two-dimensional visualization, the computer implemented information retrieval method can also be understood to be a computer-implemented dimensionality reduction method.

In a preferred embodiment, establishing an index structure for a plurality of database objects comprises providing a descriptor for each of the plurality of database objects and a plurality of hash functions and specifying at least one index tree by performing a locality sensitive hashing of the descriptor based on the plurality of hash functions. Despite the fact that a descriptor is needed for each of the plurality of database objects, the overall computational effort is low for this step as determining hash functions can be done easily and, furthermore handling the hash functions thereafter in particular for performing a locality sensitive hashing allows for the fast generation of intermediate results that allow reduction of memory accesses and computational steps during the execution of the computer implemented method.

In a preferred embodiment, situations may occur where index trees that have been specified comprise one or more sequences of linear nodes. In such a case, it is possible to collapse the index structure, further reducing the computational expense while maintaining a high precision without deleting relevant information.

Typically, more than one index tree is calculated and thus an entire forest is specified.

The term "forest," as used herein, refers to a disjoint union of at least two trees.

It should be noted that for determining an entire "locality sensitive hashing forest", each database object only needs to be retrieved once from a hard disc, cloud or any computer readable non-volatile memory, thus resulting in a favorable database object access pattern.

Where an LSH Forest is provided, the number of trees will typically be smaller than the number of different hashing functions, in particular smaller than half of the number of different hashing functions. The larger number of different hashing functions allows to distinguish different molecules better whereas providing more trees helps in generating a useful minimum spanning tree.

In certain embodiments the method of the invention may be used for any chemical compound database, any MoleculeNet benchmark dataset, any dataset wherein the objects are indicative for text, and/or any other database wherein the method is useful, such as databases wherein the database objects are images text, gene expression, co-regulation scores, signal intensity and/or particle ID. While a plurality of different methods of providing or establishing an index structure for a plurality of database objects exist, a typical use case is where the database objects are chemical molecules or combinations of molecules and the index structure for a plurality of such database objects is established in a manner relying on a molecular fingerprint as a descriptor, in particular an MHFP or ECFP fingerprint.

The term "molecular fingerprint", as used herein, refers to a descriptor (e.g. an n-dimensional vector) indicative for properties of a molecule. Typically, a molecular fingerprint is the molecular structure of a molecule encoded in a string (e.g., a bit string, such as a bit string with a size of 512 bits). Examples of molecular fingerprints include, but are not limited to MHFP (e.g., MHFP4 or MHFP6), ECFP (e.g., ECFP4 or ECFP6), MAP (e.g., MAP4), SECFP6, MHECFP, MACCS.

It is to be understood that these descriptors and the way they are derived are well known in the art and the average skilled person will have access to corresponding literature, for example, the article by D. Probst & J. L. Reymond in Journal of Cheminformatics (2018, 10: 66), as cited herein above.

Also, the index structure could be a MinHash encoding, in particular where the database objects are encoded as text strings.

The term "Minhash", as used herein, refers to a technique for approximating the jaccard distance between two different sets.

Where the database objects are binary objects, a Weighted MinHash encoding could be used for establishing an index structure in a preferred embodiment. Note that a variety of methods to establish an index structure exists and that the methods suggested here for specific databases have been proven particularly effective although it is to be understood that even for those kinds of database objects specifically mentioned, other ways of establishing an index structure will exist.

These steps to establish an index can be particularly resource-efficient, and suited for large datasets and/or surprisingly low demanding in computer resources for many kinds of database objects, in particular for databases wherein the database objects represent chemical compounds.

Also, where nearest neighbors are searched, it will be understood that evaluating the distance of two neighbors enhances the method of identifying nearest neighbors using any of the variety of distance measures such as a Hamming distance, a Levenshtein distance measure, a Cosine similarity measure and a Jaccard similarity measure, and so on. It is believed that these different measures are well known to the skilled person and need not be explained here in detail. However, it is understood that in the literature cited above, these different distances and the way a distance can be determined according to each method are explained. Accordingly, the cited documents are fully incorporated herein by reference with respect to the determination of a distance measure.

When generating a minimum spanning tree from nearest neighbors found, a situation might occur where the factual next neighbor would not be identified by the computer-implemented information retrieval method of the present invention. Also, it is possible that the distance measures suggested above or any other distance measure used will provide more than one allegedly nearest neighbor or might not provide the factual nearest neighbor at all. In order to produce useful results, nonetheless, it is suggested to determine a number k of approximate next neighbors and to generate then the minimum spanning tree based on these next neighbors identified. In this manner, again, the overall computational effort remains at levels than can be easily handled while the visualization still gives very good and useful results.

Typically, generating visualization data comprises mapping the nodes of a minimum spanning tree generated onto a two-dimensional surface such as the surface of a screen. However, it would also be possible to project the nodes thereof onto a two-dimensional (non-flat) surface in a three-dimensional space. Such mapping can be affected by calculating a node arrangement wherein the nodes of the minimum spanning tree repel each other. Such repulsion can be calculated based on a spring-elastic model, which gives an excellent visual representation.

In certain embodiments, the method of the invention comprises the use of a force-directed graph drawing technique.

The term "force-directed graph drawing technique," as used herein, refers to a class of algorithms for drawing graphs by assigning forces among the set of edges and the set of nodes, based on their relative positions, and then using these forces either to simulate the motion of the edges and nodes or to minimize their energy with the purpose of positioning the nodes of a graph in two-dimensional or three-dimensional space so that all the edges are of similar length and the number of crossing edges is low. Examples of force-directed graph drawing techniques are undirected graph drawing techniques (e.g., spring models, spring electrical models), directed graph drawing algorithms (e.g., layered graph layout) and other techniques described by Kobourov, Stephen G. "Force-directed drawing algorithms" (2004).

The use of a force-directed graph drawing technique allows the generation of visualization data, which is particularly beneficial for recognition, use and/or interpretation by the user. Since the force-directed graph drawing technique relies on physical analogies of common objects forces, comparable to mechanical springs and electrical repulsion, the generated visual data is particularly easy to predict and understand. Further, the force-directed graph drawing technique performs particularly well in uniform edge length, uniform node distribution and showing symmetry. Force-directed graph drawing technique can also be easily adapted and extended to fulfill additional functional and/or aesthetic criteria (e.g., 3D graph drawing or dynamic graph drawing).

In certain embodiments, the method of the invention uses an efficient probabilistic layout algorithm.

The term "efficient probabilistic layout algorithm", as used herein, refers to a layout algorithm with a probabilistic global optimization algorithm that allows for the generation of visualization data from a minimum spanning tree with sub-quadratic running time.

The computational complexity of the probabilistic layout algorithm may be a key factor for the computational complexity of the method of the invention. Therefore, by using an efficient probabilistic layout algorithm, the computational complexity of the method of the invention can be surprisingly low.

In certain embodiments, the method of the invention uses a spring-electrical model layout method with a multilevel multipole-based force approximation.

The term "spring-electrical model", as used herein, refers to an algorithm that models edges as springs and vertices as charged particles to run an iterative physics simulation to compute vertex positions. An example of a spring-electrical model is described by Eades, Peter. "A heuristic for graph drawing." Congressus numerantium 42 (1984): 149-160.

The term "multilevel multipole-based force approximation," as used herein, refers to a force-directed method that is based on a combination of a multilevel scheme and a strategy for approximating the repulsive forces in the system by evaluating potential fields. An example of a multilevel multipole-based force approximation is described by Hachul, Stefan, and Michael Jünger. "Drawing large graphs with a potential-field-based multilevel algorithm." International Symposium on Graph Drawing. Springer, Berlin, Heidelberg, 2004.

Since in some layout algorithms, such as the spring-electrical model, many iterations are needed to transform an initial drawing of the minimum spanning tree into the visualization data, some embodiments of the invention reduce the constant factor of layout algorithms by using a multilevel multipole-based force approximation algorithm.

By combining these steps, the method is surprisingly resource-efficient, and suited for large datasets, beneficial for locality preserving performance and/or surprisingly low demanding for computer resources for information retrieval, for generating visualization data and/or for visualization of data.

The data output of the computer-implemented information retrieval method can be a combination of portable web browser-readable files such as an HTML file and its linked files or be dynamically loaded from a web server as a combination of browser-readable file types. The visualization data could also be used to generate an image directly on display or to provide a printout.

The present invention will now be described with reference to the drawings.

FIG. 1 Visualizing associated biological entity classes of ChEMBL molecules and perfomance.

Figure 2:
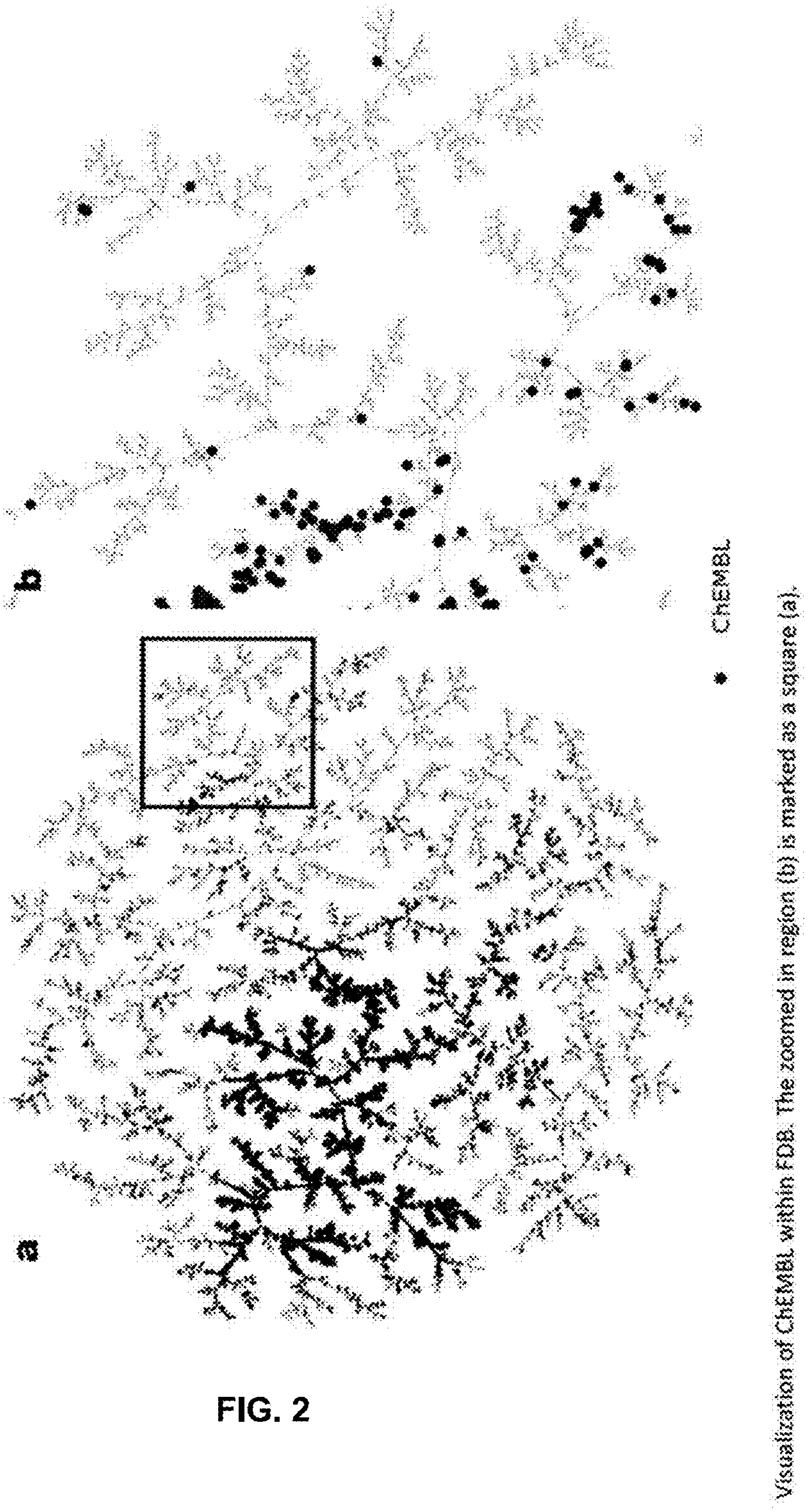

FIG. 2 Visualization of ChEMBL and FDB17.

Figure 3:
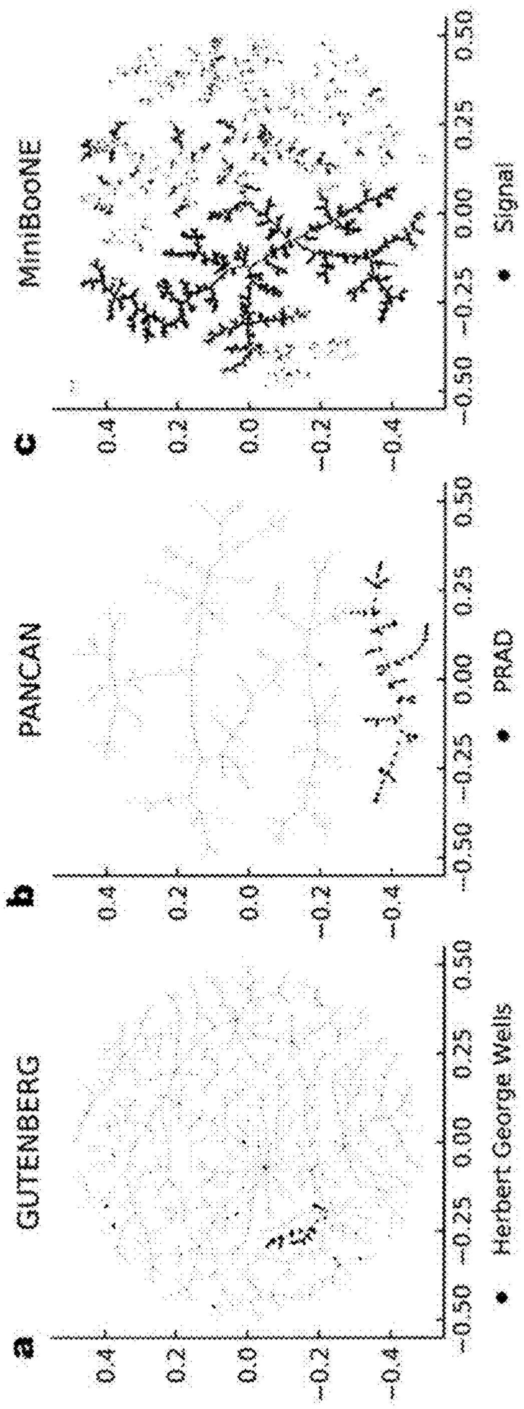
Figure 4:
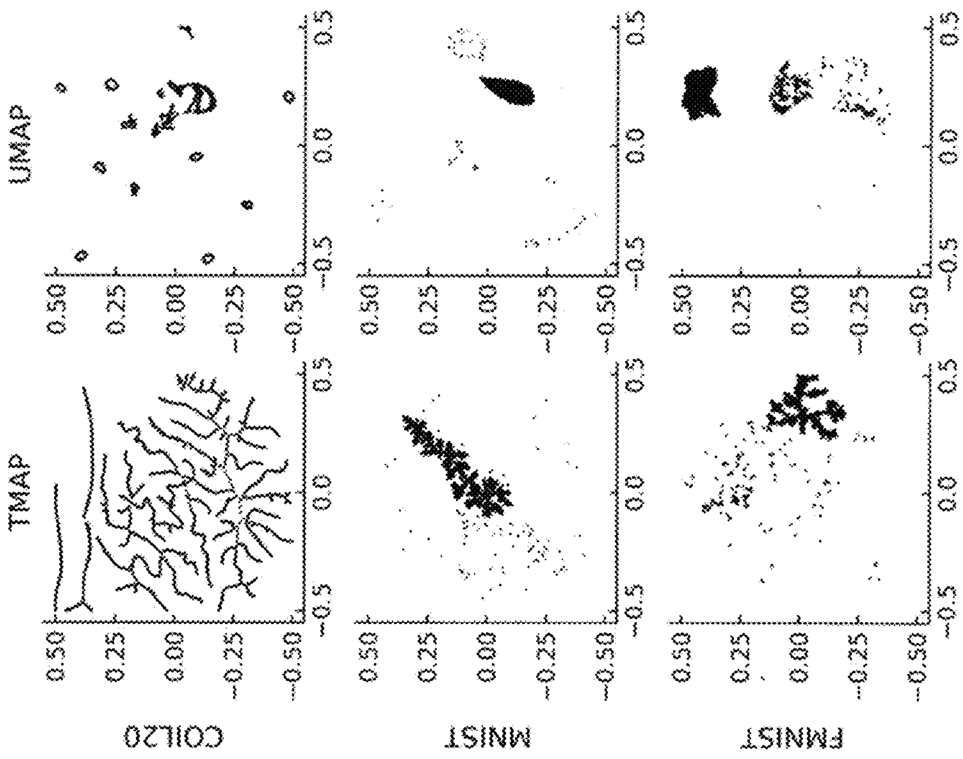
Figure 5:
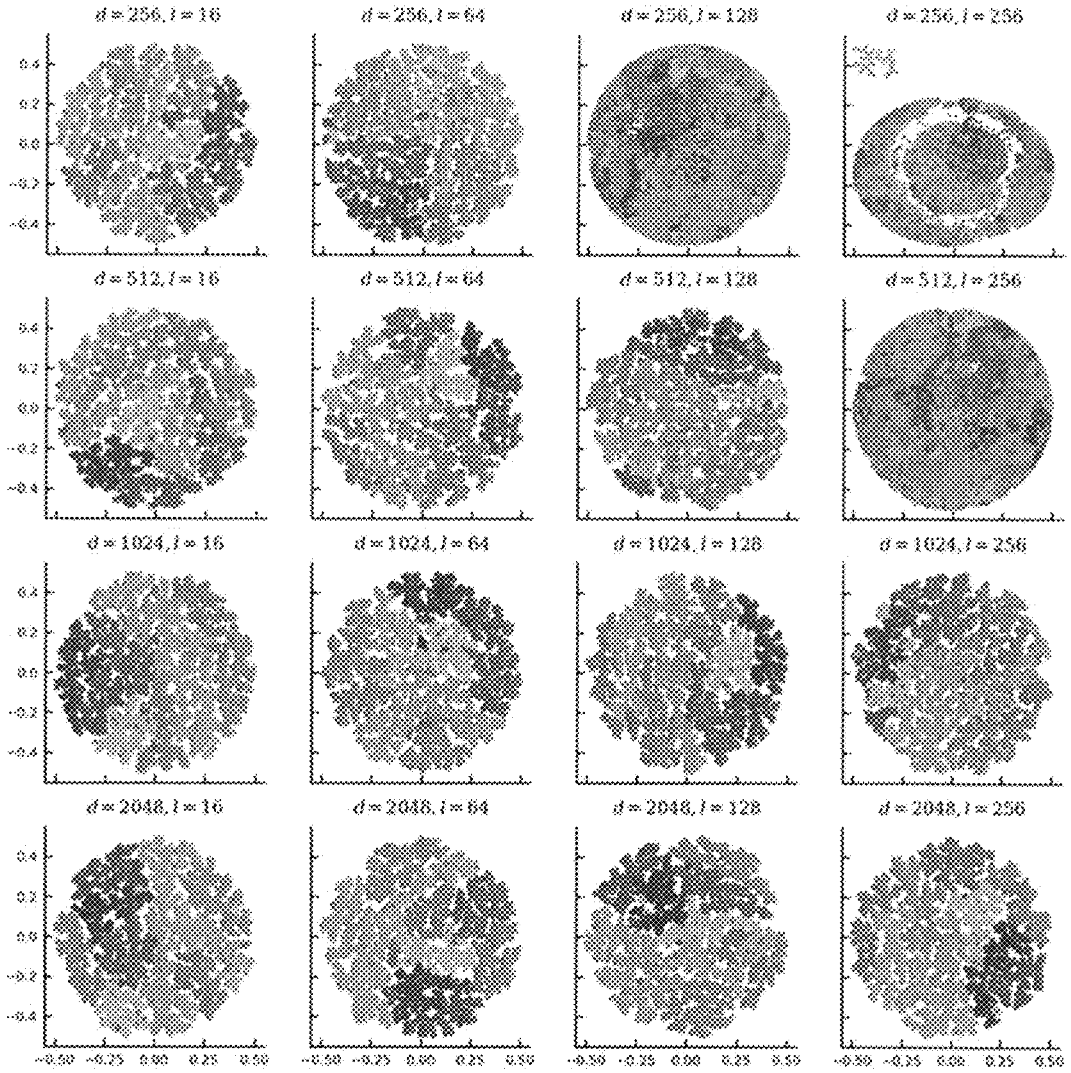

FIG. 3 Visualizing linguistics, RNA sequencing, and particle physics data sets FIG. 4 Comparison between the method of the present invention and UMAP on benchmark data sets FIG. 5 Influence of LSH Forest parameters d and 1 on visualization of MNIST.

EXAMPLES

The method of present invention is described hereinafter by way of an example that uses a TMAP (tree-map) based approach, which exploits locality sensitive hashing, MinHash, and LSH forests, uses a k-nearest-neighbor search algorithm, Kruskal's minimum-spanning-tree algorithm, and a multilevel multipole-based graph layout algorithm to represent large and high dimensional data sets as a tree structure, which is readily understandable and explorable.

In a first example, TMAP is exemplified in the area of cheminformatics with interactive maps for 1.16 million drug-like molecules from ChEMBL, 10.1 million small molecule fragments from FDB17, and 131 thousand 3D-structures of biomolecules from the PDB Databank.

Then, a computer-implemented information retrieval method for retrieving information from a database of objects is described wherein the steps of establishing an index structure for a plurality of database objects, searching the index structure for nearest neighbors of database objects, generating a minimum spanning tree from nearest neighbors found, and generating visualization data from the minimum spanning tree is used to allow visualization of data from the literature (GUTENBERG dataset), cancer biology (PANSCAN dataset) and particle physics (MiniBooNE dataset).

It will be seen that compared to other methods of generating visualization data such as t-SNE or UMAP, the size of data sets that can be visualized with TMAP is increased due to the significantly lower memory requirements and running time of the method of present invention so that there is broad applicability in the age of big data.

Databases Used in the Examples

The recent development of new and often very accessible frameworks and powerful hardware has enabled the implementation of computational methods to generate and collect large high dimensional data sets and created an ever-increasing need to explore as well as understand these data. Large high dimensional data sets can be considered to be large matrices where rows are samples and columns are measured or calculated variables, each column defining a dimension of the space which contains the data. Visualizing such data sets is challenging because reducing the dimensionality, which is required in order to make the data visually interpretable for humans, is both lossy and computationally expensive.

Databases of millions of molecules used in the area of drug discovery, such as the ChEMBL database of bioactive molecules from the scientific literature and their associated biological assay data (n=1,159,881), (cmp. Gaulton, A. et al. The ChEMBL database in 2017. Nucleic Acids Research 45, D945-D954 (2017)) from which mathematical representations of chemical structures in the form of molecular fingerprints (high-dimensional binary or integer vectors, encoding structure or composition) are calculated, represent a typical case of need (cmp. Riniker, S. & Landrum, G. A. Open-source platform to benchmark fingerprints for ligand-based virtual screening. Journal of Cheminformatics 5, 26 (2013)). The problem extends to even larger molecular databases, as exemplified here for FDB17, a database of 10.1 million theoretically possible fragment-like molecules of up to 17 atoms, (cmp. Visini, R., Awale, M. & Reymond, J.-L. Fragment Database FDB-17. *J. Chem. Inf. Model.* 57, 700-709 (2017)) as well as for databases of biomolecules such as the RSCB Protein Databank. (cmp. Berman, H. M. et al. The Protein Data Bank. Nucleic Acids Res 28, 235-242 (2000)).

General Problems of Dimensionality Reduction

For databases such as those outlined above, simple linear dimensionality reduction methods such as principal component analysis and similarity mapping readily produce 2D- or 3D-representations of global features (cmp. Oprea, T. I. & Gottfries, J. Chemography: the art of navigating in chemical space. J Comb Chem 3, 157-166 (2001); Awale, M. & Reymond, J.-L. Similarity Mapplet: Interactive Visualization of the Directory of Useful Decoys and ChEMBL in High Dimensional Chemical Spaces. J. Chem. Inf. Model 55, 1509-1516 (2015); Jin, X. et al. PDB-Explorer: a web-based interactive map of the protein data bank in shape space. BMC Bioinformatics 16, 339 (2015); Probst, D. & Reymond, J.-L. FUn: a framework for interactive visualizations of large, high-dimensional datasets on the web. Bioinformatics 34, 1433-1435 (2018)).

However, local features defining the relation between close or even nearest neighbor (NN) molecules, which are very important in drug research, are mostly lost, limiting the applicability of linear dimensionality reduction methods for visualization.

It can be understood that the NN relationships are important and will be much better preserved using non-linear manifold learning algorithms, which assume that the data lies on a lower-dimensional manifold embedded within the high-dimensional space. Manifold learning algorithms such as non-linear principal component analysis (NLPCA or autoencoders), t-distributed stochastic neighbor embedding (t-SNE), and more recently uniform manifold approximation and projection (UMAP) are based on this assumption (cmp. McInnes, L., Healy, J. & Melville, J. UMAP: Uniform Manifold Approximation and Projection for Dimension Reduction. arXiv:1802.03426 [cs, stat] (2018); Maaten, L. van der & Hinton, G. Visualizing Data using t-SNE. Journal of Machine Learning Research 9, 2579-2605 (2008)).

Other techniques used in the prior art are probabilistic generative topographic maps (GTM) and self-organizing maps (SOM), which are based on artificial neural networks (cmp. Bishop, C. M., Svensén, M. & Williams, C. K. I. GTM: The Generative Topographic Mapping. Neural Computation 10, 215-234 (1998); Kohonen, T. Exploration of very large databases by self-organizing maps. in Proceedings of International Conference on Neural Networks (ICNN'97) 1, PL1-PL6 vol. 1 (1997)).

However, these algorithms have time complexities between at least $O(n^{1.14})$ and $O(n^{5})$, limiting the size of to be visualized data sets. (cmp. Dong, W., Moses, C. & Li, K. Efficient k-nearest neighbor graph construction for generic similarity measures. in Proceedings of the 20th international conference on World wide web—WWW '11 577 (ACM Press, 2011). doi:10.1145/1963405.1963487). The same limitations in terms of data set size apply when distributing data in a tree by implementing the neighbor-joining algorithm used to create phylogenetic trees (cmp. Saitou, N. & Nei, M. The neighbor-joining method: a new method for reconstructing phylogenetic trees. Mol Biol Evol 4, 406-42). This limiting behavior has been documented by the ChemTreeMap tool, which can only visualize up to approximately 10,000 data points (molecules or clusters of molecules) (cmp. Lu, J. & Carlson, H. A. ChemTreeMap: an interactive map of biochemical similarity in molecular datasets. Bioinformatics 32, 3584-3592 (2016)).

In contrast, as will be shown hereinafter, an approach to generate and distribute intuitive visualizations of large data sets in the order of up to (10)^7 with arbitrary dimensionality based on the inventive method using a combination of locality sensitive hashing, graph theory, and applicable in a context of modern web technology is disclosed. In terms of time and space complexity, the proposed method is superior to methods based on approaches known as t-SNE and UMAP Also, the method provides visualizations data for the exploration and interpretation of large data sets that due to the tree-like nature and the transparency of the inventive method provides better, more intuitive and more interpretable visualizations than visualization databased on t-SNE or UMAP General Outline of the Method Given an arbitrary data as an input, the method disclosed encompasses four phases:

- (I) LSH forest indexing (cmp. Andoni, A., Razenshteyn, I. & Nosatzki, N. S. LSH Forest: Practical Algorithms Made Theoretical. in Proceedings of the Twenty-Eighth Annual ACM-SIAM Symposium on Discrete Algorithms 67-78 (Society for Industrial and Applied Mathematics, 2017). doi:10.1137/1.9781611974782.5; Bawa, M., Condie, T. & Ganesan, P. LSH forest: self-tuning indexes for similarity search. in Proceedings of the 14th international conference on World Wide Web—WWW '05 651 (ACM Press, 2005). doi: 10.1145/1060745.1060840).
- (II) Construction of a c-approximate k-nearest neighbor graph.
- (III) Calculation of a minimum spanning tree (MST) of the c-approximate k-nearest neighbor graph, (cmp. Kruskal, J. B. On the shortest spanning subtree of a graph and the traveling salesman problem. Proc. Amer. Math. Soc. 7, 48-48 (1956)).
- (IV) Generation of a layout for the resulting MST (cmp. Chimani, M. et al. The Open Graph Drawing Framework (OGDF). Handbook of Graph Drawing and Visualization 2011, 543-569 (2013)).

During phase I, the input data are indexed in an LSH forest data structure, enabling c-approximate k-nearest neighbor searches with a time complexity sub-linear in n. Text and binary data are encoded using the MinHash algorithm, while integer and floating-point data are encoded using a weighted variation of the method. More specifically, chemical structures are encoded using MHFP6, a chemical fingerprint that was previously shown to be superior to the well-known ECFP4 for virtual screening tasks, which yields MinHash representations of the input molecules (cmp. Rogers, D. & Hahn, M. Extended-Connectivity Fingerprints. J. Chem. Inf. Model 50, 742-754 (2010); Probst, D. & Reymond, J.-L. A probabilistic molecular fingerprint for big data settings. Journal of Cheminformatics 10, 66 (2018)).

The LSH Forest data structure for both MinHash and weighted MinHash data is initialized with the number of hash functions d used in encoding the data, and the number of prefix trees 1. An increase in the values of both parameters lead to an increased main memory usage; however, higher values for 1 also increase query speed. The effect of parameters d and 1 on the final visualization is shown in FIG. 5. Note in FIG. 5 that while phase I of the algorithm mainly influences the preservation of locality, extreme values where d≈1 lead to a deterioration of visualization quality. The use of a combination of (weighted) MinHash and LSH Forest, which supports fast estimation of the Jaccard distance between two binary sets, has been shown to perform very well for molecules; other data structures and methods implementing a variety of different distance metrics may show much better performance on other data and can be used as a drop-in replacement of phase I.

In phase II, an undirected weighted c-approximate k-nearest neighbor graph (c-k-NNG) is constructed from the data points indexed in the LSH forest, where an augmented variant of the LSH forest query approach previously introduced for virtual screening tasks, is used to increase efficiency. The c-k-NNG construction phase takes two arguments, namely k, the number of nearest-neighbors to be searched for, and $k_c$, the factor used by the augmented query method. This variant of the query method increases the time complexity of a single query from O(log n) to $O(k \cdot k_c + \log n)$, resulting in overall time complexity of $O(n(k \cdot k_c + \log n))$, where practically $k \cdot k_c > \log n$, for the c-k-NNG construction. The edges of the c-k-NNG are assigned the Jaccard distance of their incident vertices as their weight. Depending on the distribution and the hashing of the data, the c-k-NNG can be disconnected (1) if outliers exist which have a Jaccard distance of 1.0 to all other data points and are therefore not connected to any other nodes or (2) if, due to clusters of size ≥k in the Jaccard space, connected components are created. However, the following phases are agnostic to whether this phase yields a disconnected graph. The effect of parameters k and $k_c$ on the final visualization of MNIST can be that the influence of LSH Forest parameters k and $k_c$ on the visualization of MNIST is such that whereas parameter k directly influences the average degree of the k-nearest neighbor graph, $k_c$ increases the quality of the returned k nearest neighbors. Both parameters only marginally influence the aesthetics and quality of the visualization.

Alternatively, an arbitrary graph can be supplied to the method as a weighted edge list.

During phase III, a minimum spanning tree (MST) is constructed on the weighted c-k-NNG using Kruskal's algorithm. The algorithm reaches a globally optimal solution by applying a greedy approach of selecting locally optimal solutions at each stage—properties that are also desirable in data visualization. The time complexity of Kruskal's algorithm is O(E+log V), rendering this phase negligible compared to phase II in terms of execution time. In the case of a disconnected c-k-NNG, a minimum spanning forest is created. Other algorithms for MST construction can be used to replace Kruskal's algorithm of this step in alternative embodiments. Phase IV lays out the tree on the Euclidean plane. As the MST is unrooted and to keep the drawing compact, the tree is not visualized by applying a tree but a graph layout method. In order to draw MSTs of considerable size (millions of vertices), a spring-electrical model layout method with multilevel multipole-based force approximation is applied. The layout method is provided by the open graph drawing framework (OGDF), a modular C++ library. In addition, the use of the OGDF allows for effortless adjustments to the graph layout method in terms of both aesthetics and computational time requirements. Whereas a number of parameters can be configured for the layout phase, only parameter p has to be adjusted based on the size of the input data set. It can be seen that the point size parameter p has a major influence on the aesthetics of the visualization as it controls the sparseness of the drawn tree. Decreasing the point size and thus the repulsive force between two points, allows the layout algorithm to draw points closer to their respective (sub) branches. This phase constitutes the bottleneck regarding computational complexity.

An important phase of the described method is the construction of a minimum spanning tree (MST) on the weighted c-approximate k-nearest neighbor graph (c-k-NNG). Whereas comparable methods such as UMAP or t-SNE attempt, in essence, to embed pruned graphs, the method of present invention removes all cycles from the initial graph using the MST method, significantly lowering the computational complexity of low dimensional embedding. In addition, the tree-based layout enables visual inspection of the data in a high resolution by explicitly visualizing the closest distance between clusters, the detailed structure of clusters through branches and sub-branches, and the points of connections between false positives and true positives. The quality of the method was qualitatively assessed and compared to UMAP by visualizing common benchmarking data sets MNIST, FMNIST, and COIL20 (FIG. 4).

Note that FIG. 4 shows a comparison between the method of the present invention and UMAP on benchmark data sets. To assess the general performance of the present invention, it was applied to three computer vision benchmark data sets and compared to UMAP. In comparison to UMAP, which represents clusters as tightly packed patches and tries to reach maximal separation between them, the present invention visualizes the relations between as well as within clusters as branches and sub-branches. While UMAP is capable of representing the circular nature of the COIL20 subsets, the present invention cuts the circular clusters at the edge of the largest difference and joins subsets through one or more edges of the smallest difference. However, the plot shows that this removal of local connectivity leads to an untangling of highly similar data. For the MNIST and FMNIST data sets, the tree structure results in a higher resolution of both variances and errors within clusters as it becomes apparent how sub-clusters (branches within clusters) are linked and which true positives connect to false positives.

Assessment and Comparison with UMAP for Visualizing ChEMBL

To illustrate the method of the present invention, the method was applied to visualize data from ChEMBL and compare its performance with the state-of-the-art visualization method UMAP. For this analysis, molecular structures were encoded using ECFP4 (extended connectivity fingerprint up to 4 bonds, 512-D binary vector), a molecular fingerprint encoding circular substructures, and which performs well in virtual screening and target prediction. (cmp. Probst, D. & Reymond, J.-L. A probabilistic molecular fingerprint for big data settings. Journal of Cheminformatics 10, 66 (2018)).

To compare the visualization performance of both methods, a subset $S_t$ of the top 10,000 ChEMBL compounds by insertion, the date was considered, as well as a random subset $S_r$ of 10,000 ChEMBL molecules, and calculated 2D coordinates for the visualization using the method of present invention (running time 4.685 seconds, peak memory usage 0.223 GB) and for comparison UMAP (running time 20.985 seconds, peak memory usage 0.383 GB). Taken the more homogeneous set $S_t$ as an input, the 2D-maps produced by each representation, plotted using the Python library matplotlib, illustrate that the method of present invention, which distributes clusters in branches and subbranches of the MST, produces a much more even distribution of compounds on the canvas compared to UMAP, thus enabling better visual resolution (FIG. 1*a, b*). Note that in FIG. 1, the first n compounds $S_t$ (a, b, e) and a random sample $S_r$ (c, d, f) are visualized, each of size n=10,000, were drawn from the 512-D ECFP-encoded ChEMBL data set to visualize the distribution of biological entity classes and k-nearest neighbors, respectively. In more detail, in (a), the method of the present invention lays out the data as a single connected tree, whereas (b) UMAP draws what appears to be a highly disconnected graph, with the connection between components becoming impossible to assert. the method of the present invention keeps the intra and inter-cluster distances at the same magnitude, increasing the visual resolution of the plot. (c, d) The 20 nearest neighbors of a randomly selected compound from a random sample. (c) the method of the present invention directly connects the query compound to three of the 20 nearest neighbors (1, 2, 15); nearest neighbors 1 through 7 are all within a topological distance of 3 around the query compound. (d) The closest nearest neighbors of the same query compound in the UMAP visualization are true nearest neighbors 2, 3, 18, 9, and 1, with 1 being the farthest of the five. (e, Ranked distances from true nearest neighbor in original high dimensional space after projection based on topological and Euclidean distance for data sets $S_t$ and $S_r$ respectively. (g) Computing the coordinates for a random sample (n=1,000,000) highlights the running time behavior the method of the present invention, and allows inspection of the time and space requirements of the different phases of the method. Four random samples increasing in size (n=10,000, n=100,000, n=500,000, and n=1,000,000) detail the differences in memory usage (h) and running time (i) between the method of the present invention and UMAP. ($t_{TMAP}$=4.865s, $a_{TMAP}$=0.223 GB; $t_{UMAP}$=20.985s, $a_{UMAP}$=0.383 GB and $t_{TMAP}$=33.485s, $a_{TMAP}$=1.12 GB; $t_{TMAP}$=115.661s, $a_{UMAP}$=2 0.488 GB respectively) ($t_{TMAP}$=175.89s, $a_{TMAP}$=4.521 GB; $t_{UMAP}$=3,577.768s, $a_{UMAP}$=18.854 GB and $t_{TMAP}$=354.682s, $a_{TMAP}$=8.553 GB; $t_{UMAP}$=41,325.944s, $a_{UMAP}$=48.507 GB, respectively) where the molecule expressed the highest activity in a biological assay.

Furthermore, nearest neighbor relationships (locality) are better preserved in the method of the present invention compared to UMAP, as illustrated by the positioning of the 20 structurally nearest neighbors of compound CHEMBL370160222, reported as a potent inhibitor of human tyrosine-protein kinase SYK, in a visualization of the heterogeneous set $S_r$. The 20 structurally nearest neighbors are defined as 20 nearest neighbors in the original 512-dimensional fingerprint space. The method of the present invention directly connects the query compound to three of the 20 nearest neighbors, CHEMBL3701630, CHEMBL3701611, and CHEMBL38911457, its nearest, second nearest, and 15th nearest neighbor respectively. The nearest neighbors 1 through 7 are all within a topological distance of 3 around the query (FIG. 1*c*). In contrast, UMAP has positioned nearest neighbors 2, 3, 9, and 18, among several even more distant data points, closer to the query than the nearest neighbor from the original space (FIG. 1*d*). Indeed, the method of the present invention preserves locality in terms of retaining 1-nearest neighbor relationships much better than UMAP, applying both topological and Euclidean metrics (FIG. 1*e, f*). Ranked distances from true nearest neighbor in original high dimensional space after projection based on topological and Euclidean distance for the MNIST data set. Whereas UMAP preserves less than 10% of true 1-nearest neighbors, the present invention preserves more than 80% based on topological and more than 35% based on Euclidean distance.

In terms of computational performance, it can be seen that the method of the present invention is comparable to UMAP for running time t and memory usage a for small random subsets of the 512-D ECFP-encoded ChEMBL data set with sizes n=10,000 and n=100,000 yields, while for larger random subsets (n=500,000 and n=1,000,000) the method of the present invention significantly outperforms UMAP (FIG. 1*h, i*). Further insight into the computational behavior of the method of the present invention is provided by analyzing running times for the different phases based on a larger subset (n=1,000,000) of the ECFP4-encoded ChEMBL data set (FIG. 1*g*). During phase I of the method, which accounts for 180 s of the execution time and approximately 5 GB of main memory usage, data is loaded and indexed in the LSH Forest data structure in chunks of 100,000, as expressed by 10 distinct jumps in memory consumption. The construction of the c-k-NNG during phase II requires a neglectable amount of main memory and takes approximately 110 s. During 10 seconds of execution time, MST creation (phase III) occupies a further 2 GB of memory of which approximately 1 GB is retained to store the tree data structure. The graph layout method (phase IV) requires 2 GB throughout 55 s, after which the method completes after a total wall clock time of 355 s and peak main memory usage of 8.553 GB.

It will be understood that operating a system in a manner requiring less time, with all other parameters being equal, will result in lower energy consumption. The same holds for memory usage. Hence, the method of present invention is reducing energy consumption during processing quite significantly.

Visualizing ChEMBL and FDB17

The high performance and relatively low memory usage of the method of the present invention and the ability to generate highly detailed and interpretable representations of high-dimensional data sets allows for an unprecedented interactive visualization of chemical spaces. To illustrate this point, we have computed according to the method of the present invention coordinates for ChEMBL compounds (n=1,159,881). Here MHFP6 (512 MinHash permutations) was used, a molecular fingerprint related to ECFP4 but with better performance for virtual screening and the ability to be used with LSH (cmp. Probst, D. & Reymond, J.-L. A probabilistic molecular fingerprint for big data settings. Journal of Cheminformatics 10, 66 (2018)).

The method of the present invention successfully completed within 613 seconds with a peak memory usage of 20.562 GB.

To illustrate the application to even larger datasets, ChEMBL (n=1,159,881) was merged with fragment database (FDB17) compounds (n=10,101,204). The coordinates computed by the method of the present invention were eventually exported as a set of interactive portable web browser-readable (HTML and JavaScript) files using Faerun (FIG. 2) and visually inspected. In FIG. 2*a*, the combined set of ChEMBL and FDB17 is visualized. FIG. 2*b* is an enlarged view of the frame outline in FIG. 2*a*. FDB17 molecules are shown in light gray and ChEMBL molecules in larger black dots. The resulting plot reflects the strong association of a large fraction of ChEMBL molecules embedded in the larger FDB17 space.

Application to Other Scientific Data Sets

In order to test the general applicability of the method of the present invention, the method was used to visualize data sets from the fields of linguistics, biology, and particle physics. The GUTENBERG data set is a selection of n=3,036 books by 142 authors written in English (cmp. Lahiri, S. Complexity of Word Collocation Networks: A Preliminary Structural Analysis. arXiv:1310.5111 [physics] (2013)).

A book fingerprint was defined as a dense-form binary vector indicating which words from the universe of all words extracted from all books occurred at least once in a given book (yielding a dimensionality of d=1,217,078). The book fingerprints were indexed using the LSH Forest data structure and MinHash. The PANCAN data set (n=801, d=20,531) consists of gene expressions of patients having different types of tumors (PRAD, KIRC, LUAD, COAD, and BRCA), randomly extracted from the cancer genome atlas database (cmp. The Cancer Genome Atlas Research Network et al. The Cancer Genome Atlas Pan-Cancer analysis project. Nature Genetics 45, 1113-1120 (2013)).

PANCAN was indexed using the LSH Forest data structure and weighted MinHash. The MiniBooNE data set (n=130,065, d=50) consists of measurements extracted from Fermilab's MiniBooNE experiment and contains the detection of signal (electron neutrinos) and background (muon neutrinos) events (cmp. Roe, B. P. et al. Boosted Decision Trees as an Alternative to Artificial Neural Networks for Particle Identification. Nuclear Instruments and Methods in Physics Research Section A: Accelerators, Spectrometers, Detectors and Associated Equipment 543, 577-584 (2005)).

As the attributes in MiniBooNE are real numbers, and to demonstrate the modularity of the proposed method, the Annoy indexing library, which supports the cosine metric, was used in phase I of the method to index the data for k-NNG construction.

Note that in FIG. 3, the application of the present invention to a different database is shown. In more detail, it is shown according to (FIG. 3*a*) for The GUTENBERG data set, a selection of books by 142 authors (n=3,036, d=1,217,078). The maps separated works by different authors in distinct branches, as illustrated for work by HG Wells. (FIG. 3*b*) The PANCAN data set (n=801, d=20,531) consists of gene expressions data of five types of tumors (PRAD, KIRC, LUAD, COAD, and BRCA) and was indexed using a weighted variant of the MinHash algorithm. The maps separates the different tumor types in different branches, here illustrate for PRAD (black dots) (FIG. 3*c*) The MiniBooNE data set (n=130,065, d=50) consists of measurements extracted from Fermilab's MiniBooNE experiment. The method of the present invention visualizes the distribution of the signal data (black dots) among the background.

In summary, a method of generating visualization data is disclosed, which is suitable for very large, high-dimensional data sets such as those containing molecular information. Compared to other currently available methods such as t-SNE or UMAP, the present invention excels with its low memory usage and running time. The method of the invention has been shown to generate visualizations with empirical sub-linear time complexity of $O(n^{0.931})$ when processing real-world chemical data and/or non-chemical data (e.g., image data, omics data, journal citation data, Gutenberg data, data extracted from scientific articles, flow cytometry data). This allows to process larger databases in a given, acceptable time and/or get better results, e.g., in drug discovery. In addition, it facilitates high interpretability of the resulting visualization, the ability to preserve and visualize both global and local features, and has been shown to be applicable to arbitrary data sets such as images, text, or RNA-seq data, hinting at its usefulness in a wide range of fields including computational linguistics or biology.

As available parameters can be adjusted easily and by the leveraging of output quality and memory usage according to the invention, the method does not require specialized hardware for high-quality visualizations even where data sets are containing millions of data points.

Also, the method of the invention has been shown to support, e.g., a Jaccard similarity estimation through MinHash and weighted MinHash for binary or text and integer or floating-point sets, respectively. This is helpful where a large variety of different database objects is to be addressed in a variety of applications. While the Jaccard metric has proven to be suitable for the challenges presented by chemical fingerprint similarity calculation, the metric may not be the best option available to problems presented by other data sets. However, as there exists a wide range of LSH families supporting distance and similarity metrics such as Hamming distance, $l_p$ distance, Levenshtein distance, or cosine similarity (cmp. e.g., Wang, J., Shen, H. T., Song, J. & Ji, J. Hashing for Similarity Search: A Survey. arXiv:1408.2927 [cs] (2014); or Marcais, G., DeBlasio, D., Pandey, P. & Kingsford, C. Locality sensitive hashing for the edit distance. (Bioinformatics, 2019). doi:10.1101/534446), and as these distances have been found to be compatible with the present invention, the present invention can be used in a wide variety of database objects. Furthermore, it will be understood that the modularity of the present invention allows to plug in or use nearest-neighbor-graph creation, MST creation, and graph layout techniques other than those described in the examples.

While the examples relate to specific databases, it can be understood by a person skilled in the art that the present invention can be applied to retrieve information and/or to generate visualizations from a large variety of databases having different objects with correspondingly different properties and interrelations. Thus, the examples should not be construed to restrict the disclosure to only those databases for which explicit examples have been given.

Here, an approach to generate and distribute intuitive visualizations of large data sets in the order of up to $10^7$ with arbitrary dimensionality based on a combination of locality sensitive hashing, graph theory, and modern web technology has been disclosed. In terms of time and space complexity, the proposed method is superior to methods based on approaches known as t-SNE and UMAP Also, the method provides visualizations data for the exploration and interpretation of large data sets that, due to the tree-like nature and the transparency of the inventive method, provides better visualizations than visualization databased on t-SNE or UMAP.

The invention claimed is:

1. A computer-implemented method for visualization of data objects in a database, the method comprising the steps of:

(I) establishing an index structure for a plurality of database objects, wherein the index structure is an LSH forest in which input data are indexed, by providing a descriptor for each of the plurality of database objects and a plurality of hashing functions, specifying a plurality of index trees by performing a locality sensitive hashing (LSH) of the descriptor based on the plurality of hash functions, and specifying an LSH forest as an index structure, wherein the LSH forest comprises a plurality of different index trees, (II) searching the index structure for nearest neighbors of database objects using a nearest neighbor search algorithm, (III) generating a minimum spanning tree from the nearest neighbors found using the nearest neighbor search algorithm, and (IV) using a probabilistic layout algorithm to generate visualization data from the minimum spanning tree for visualization of data objects in a database, wherein the database objects are molecules, and wherein establishing an index structure for a plurality of database objects comprises providing as a descriptor a molecular fingerprint.

2. The computer-implemented method of claim 1, wherein establishing an index structure, the database or parts thereof are retrieved from non-volatile computer-readable memory.

3. The computer-implemented method of claim 1, wherein the database comprises more than 100,000 objects.

4. The computer-implemented method of claim 1, wherein the database comprises objects having more than 20 dimensions.

5. The computer-implemented method of claim 1, wherein at least one index tree specified has at least one sequence of linear nodes, and the step of establishing the index structure comprises collapsing the linear nodes.

6. The computer-implemented method of claim 1, wherein the LSH forest comprises many trees that are smaller than the number of different hashing functions, in particular, smaller than half of the number of different hashing functions.

7. The computer-implemented method of claim 1, wherein the LSH tree or LSH forest is stored for the next neighbor search while searching for next neighbors.

8. The computer-implemented method of claim 1, wherein the molecular fingerprint is a MinHash Fingerprint (MHFP) or Extended-Connectivity Fingerprint (ECFP).

9. The computer-implemented method of claim 1, wherein the step of searching the index structure for nearest neighbors of database object comprises identifying neighbor objects that are approximately next neighbors in view of a Hamming distance measure, a Levenshtein distance measure, a Cosine similarity measure, and a Jaccard similarity measure.

10. The computer-implemented method of claim 1, wherein the step of searching the index structure for nearest neighbors of database object comprises selecting a number of k approximate next neighbor objects, in particular selecting k next neighbors from kc*k neighbors identified with a kc>1.

11. The computer-implemented method of claim 1, wherein the probabilistic layout algorithm comprises the use of a force-directed graph drawing technique.

12. The computer-implemented method of claim 1, wherein the probabilistic layout algorithm is an efficient probabilistic layout algorithm.

13. The computer-implemented method of claim 12, wherein the efficient probabilistic layout algorithm comprises the use of a spring-electrical model layout method with a multilevel multipole-based force approximation.

14. The computer-implemented method of claim 1, wherein the visualization data is output in a portable data format.

15. The computer-implemented method of claim 1, wherein establishing an index structure, the database or parts thereof are retrieved from non-volatile computer-readable memory, wherein the non-volatile computer-readable memory is a local disk, a web-server or a cloud.

16. The computer-implemented method of claim 1, wherein the LSH tree or LSH forest is stored for the next neighbor search in a RAM while searching for next neighbors.

17. The computer-implemented method of claim 1, wherein the visualization data is output in a portable data format, wherein the portable data format is portable HTML.

* * * * *